United States Patent [19]
Yanagihara

[11] Patent Number: 5,712,946
[45] Date of Patent: Jan. 27, 1998

[54] RECORDING/REPRODUCING VIDEO SIGNALS WITH A PLURALITY OF PLAYBACK SPEEDS

[75] Inventor: Naofumi Yanagihara, Tokyo, Japan

[73] Assignee: Sony Corporation, Tokyo, Japan

[21] Appl. No.: 520,176

[22] Filed: Aug. 28, 1995

[30] Foreign Application Priority Data

Aug. 31, 1994 [JP] Japan .................................. 6-206961

[51] Int. Cl.⁶ ........................... H04N 5/91; H04N 5/917; H04N 7/26
[52] U.S. Cl. .................................. 386/68; 386/111; 360/8
[58] Field of Search ........................... 358/335, 342, 358/312; 360/9.1, 10.1, 10.3, 8; 386/111, 68; H04N 5/76, 5/92

[56] References Cited

U.S. PATENT DOCUMENTS

| | | | |
|---|---|---|---|
| 5,136,437 | 8/1992 | Tabuchi et al. | 360/64 |
| 5,371,602 | 12/1994 | Tsuboi et al. | 358/335 |
| 5,450,209 | 9/1995 | Niimura et al. | 358/335 |

FOREIGN PATENT DOCUMENTS 0376675 7/1990 European Pat. Off. .
0505985 9/1992 European Pat. Off. .

*Primary Examiner*—Tommy P. Chin
*Assistant Examiner*—David R. Vincent
*Attorney, Agent, or Firm*—William S. Frommer; Alvin Sinderbrand

[57] ABSTRACT

A recording apparatus, recording/reproducing apparatus or a reproducing apparatus for digital video signals, in which ATV signals, for example, recorded directly on the recording medium, may be easily reproduced with plural varying playback speeds, and in which a playback picture output with spontaneous motion may be achieved even during low varying playback speed. A first area for directly recording the input area, a plurality of second areas for recording data of the input data obtained on intra-picture coding as first data for varying-speed reproduction and a plurality of third areas for recording the motion vector of data of the input data obtained on inter-picture predictive coding as second data for varying-speed reproduction, are provided in each track of the recording medium. The first data and the second data for varying-speed reproduction are repeatedly recorded on a number of tracks of the same azimuth corresponding to the number of speed multiples of the maximum varying playback speed.

10 Claims, 13 Drawing Sheets

HEAD A

RECORDING/REPRODUCING VIDEO SIGNALS WITH A PLURALITY OF PLAYBACK SPEEDS

CROSS-REFERENCE TO RELATED PATENTS

As applications pertinent to the present invention, JP Patent Applications Nos. 05-056576 (filing date, 1993.02.22); 05195533 (filing date, 1993.07.13); 05-287702 (filing date, 1993.10.22); 06-140242 (filing date, 1994.06.2); and 06-200878 (filing date, 1994.08.25) have been proposed by the same Assignee. The U.S. applications corresponding to these five JP application are now pending. Each of the above applications is owned by the Assignee of the present invention and is hereby incorporated by reference.

BACKGROUND OF THE INVENTION

This invention relates to a recording apparatus, a recording/reproducing apparatus and a reproducing apparatus for digital video signals. More particularly, it relates to a recording apparatus, a recording/reproducing apparatus and a reproducing apparatus for digital video signals whereby data obtained on decoding video signals by the so-called MPEG system is directly recorded and a playback picture excellent in picture quality may be produced at the time of varying speed reproduction.

Researches into a digital video tape recorder (digital VTR) in which video signals converted into digital signals are discrete cosine transformed and variable length encoded such as by Huffman code for data compression and the resulting digital video signals are recorded by a rotary head unit in accordance with the inclined azimuth recording system, are proceeding briskly. Such digital VTR can be set to a mode of recording video signals of the current television system, such as NTSC system, referred to herein as a SD mode, or to a mode of recording video signals of a so-called high definition television system (HDTV signals), referred to herein as HD mode.

In the SD mode and in the HD mode, the video signals are recorded in the form of compressed digital video signals of approximately 25 Mbps and the HDTV signals are recorded in the form of compressed digital video signals of approximately 50 Mbps.

With the conventional digital VTR, input digital video signals, that is input data, may be recorded directly on a magnetic tape, or data recorded on the magnetic tape may be reproduced and outputted directly. That is, if the function of directly recording/reproducing digital video signals (data) is annexed to the conventional digital VTR, it becomes no longer necessary to decode input encoded digital video signals for reproducing e.g., HDTV signals and to re-encode the HDTV signals in accordance with a pre-set encoding system for recording on the magnetic tape, thus eliminating hardware loss.

Specifically, if the digital VTR is fed with digital video signals, obtained on encoding video signals in accordance with e.g., the MPEG system, that is the moving picture encoding system standardized by the working group (WG) 11 of the Sub-Committee (SC) of the International Standardization Organization (IS) and the International Electrical Conference (IEC), or with digital video signals reproduced from the optical disc, it would be convenient if the digital VTR has the function of directly recording/reproducing these digital video signals.

The so-called advanced television (ATV) system, which is digital broadcasting employing the above-mentioned MPEG system as the encoding system, is hereinafter explained.

FIG. 1 shows, in a block diagram, the constitution of a transmission system of the ATV system. In FIG. 1, 101 denotes a video compressing encoder and 102 denotes an audio encoder. The video compressing encoder 101 is fed with video signals of the HDTV system via an input terminal 103. Audio signals are fed via an input terminal 104 to the audio encoder 102.

The video compressing encoder 101 encodes input HDTV signals by MPEG system by way of data compression. That is, the video compressing encoder 101 encodes and compresses the HDTV signals using a high efficiency encoding system consisting, of the combination of DCT and motion compensated predictive coding by way of data compression. From the video compressing encoder 101, an intra-field or intra-frame encoded picture, referred to herein as I-picture, data of a forward predictive coded picture, referred to herein as a P-picture, and data of bi-directionally coded picture, referred to herein as B-picture, are outputted in a pre-set sequence, as shown in FIG. 2. The picture herein means a frame or a field. With the I-picture, DCT is carried out independently without employing correlation with other pictures. With the P-picture, motion-compensated predictive coding is carried out from the previous (temporally forward) I-picture or P-picture and the difference signal or the prediction error is transformed by DCT. With the B-picture, motion-compensated predictive coding is carried out from the temporally forward and backward I-pictures or P-pictures and the difference signal or the prediction error is transformed by DCT. The period of appearance of the I-pictures is termed a group-of-pictures (GOP). In the present example, M=3 (the number of frames to the next P-picture) and N=9 (the number of frames to the next I-picture).

106 is a transport encoder for generating a packet from video data encoded by the video compressing encoder 101, audio data encoded by the audio encoder 104 and the auxiliary information entering an input terminal 107. FIG. 3 shows the constitution of a packet. As shown in FIG. 3, the transmitted packet has a packet length of 188 bytes. At the leading end of each packet is a link header having a fixed length of 4-bytes and an adaptation header of 4-bytes, followed by transmission data comprised of video data or audio data.

In FIG. 1, 108 is a channel modulator. The packet generated by the transport generator 106 is sent to the channel modulator 108. The channel modulator 108 modulates the packet using a carrier wave having a pre-set frequency. An output of the channel modulator 108 is issued at an output terminal 109.

With the ATV system, HDTV signals can be transmitted at a rate of e.g., 19 Mbps by the above-described picture compression. This rate is lower than the recording rate of approximately 25 Mbps at the SD mode of the digital VTR. Thus the signals (data) transmitted by the ATV system can be directly recorded with the SD mode of the digital VTR. If the transmitted signals are directly recorded by the digital VTR, it becomes no longer necessary to decode the transmitted signals to reproduce HDTV signals in order to enter the reproduced HDTV signals at the digital VTR, thus enabling the loss in hardware to be eliminated. On the other hand, a longer recording time can be set since recording is done with the SD mode.

However, if the signals of the ATV system are directly recorded with the SD mode on the digital VTR, optimum varying-speed reproduction cannot be achieved for the following reason. With the ATV system, compression (encoding) is carried out in accordance with the MPEG system. With the ATV system, data of the intra-picture encoded I-picture, data of a forward predictive coded P-picture and data of the bi-directionally coded picture or B-picture are transmitted, as described previously. During varying-speed reproduction, the head perpetually traverses the tracks on the magnetic tape, so that data of continuous pictures cannot be produced. If the data of the continuous pictures cannot be obtained, data of the P-picture or the B-picture cannot be decoded. It is only data of the intra-picture coded I-picture that can be decoded. Consequently, the varying speed reproduction becomes possible by using only data of the I-picture.

However, if the signals transmitted with the ATV system are directly recorded on the digital VTR, packets including I-pictures cannot be picked up sufficiently. On the other hand, it is indefinite in which relative positions data of the I-pictures have been recorded. As a result, data of the I-pictures corresponding to specified portions of the picture are dropped during varying speed reproduction and hence the picture portion cannot be updated for some time thus deteriorating the picture quality of the varying-speed reproduced picture.

Thus the present Assignee previously proposed a technique in which an area reproducible during varying speed reproduction is set as scan area for varying speed reproduction and data of the I-pictures are extracted from a bitstream of the input signals of the ATV system while the extracted data is recorded as varying speed playback data in the area for varying speed reproduction and signals of the ATV system are directly recorded in the remaining area, such as video sectors. During varying-speed reproduction, the area for varying speed reproduction is reproduced, and a picture is formed by data of the I-pictures reproduced from this area. However, the area reproducible during varying speed reproduction is changed with the varying speed playback speed. Thus it is difficult to set plural varying speed reproducing speeds. For example, if the data for varying speed reproduction are recorded in a common area in the area reproducible at various speeds, such as 17-tuple, 9-tuple or 4-tuple speeds, variable speed reproduction at the three varying speeds of 4-tuple, 9-tuple and 17-tuple speeds is feasible, while it is difficult to achieve varying-speed reproduction at any other speed.

On the other hand, since the picture updating rate becomes lower during varying-speed reproduction, especially at a lower speed, the reproduced picture exhibits unnatural movements.

SUMMARY OF THE INVENTION

It is therefore an object of the present invention to provide a recording apparatus, a recording/reproducing apparatus and a reproducing apparatus in which, when signals of the ATV system, for example, are directly recorded on a recording medium, varying-speed reproduction may be easily achieved with plural varying playback speeds and a playback picture output with natural movement may be easily obtained even with low-speed varying-speed reproduction.

In one aspect, the present invention provides a recording apparatus for recording digital video signals in which input data is a digital video signal encoded by adaptively switching between intra-picture encoding and inter-picture predictive coding and in which the digital video signal is recorded by the inclined azimuth recording system on tracks of a magnetic tape by the inclined azimuth recording system. The recording apparatus includes a first area for directly recording the input data, a plurality of second areas for recording a data portion of the input data obtained on intra-picture coding as first data for varying-speed reproduction, a plurality of third areas for recording the motion vector of a data portion of the input data obtained on inter-picture predictive coding as second data for varying-speed reproduction, means for extracting the data to be recorded in the first to third areas from the input data, multiplexing means for time-divisionally multiplexing the data extracted by the data extracting means in a sequence associated with the first to third areas, and control means for causing the first data and the second data for varying-speed reproduction to be repeatedly recorded on a number of tracks of the same azimuth corresponding to the number of speed multiples of the maximum varying playback speed.

The recording/reproducing apparatus for digital video signals according to the present invention includes a first area for directly recording the input area, a plurality of second areas for recording data of the input data obtained on intra-picture coding as first data for varying-speed reproduction, and a plurality of third areas for recording the motion vector of data of the input data obtained on inter-picture predictive coding as second data for varying-speed reproduction.

The data to be recorded in the first to third areas are extracted by data extracting means from the input data. The extracted data is time-divisionally multiplexed by multiplexing means. The first data and the second data for varying-speed reproduction are repeatedly recorded on a number of tracks of the same azimuth corresponding to the number of speed multiples of the maximum varying playback speed.

The reproducing apparatus includes data separating means for separating data reproduced from the first to third areas, first storage means supplied via the data separating means with the first data for varying speed reproduction reproduced from the first area and second storage means supplied via the data separating means with the second data for varying speed reproduction reproduced from the second area. During normal reproduction, data reproduced from the first area and the second data read out from the second storage means during varying speed reproduction are outputted as playback data to permit facilitated varying speed reproduction at plural varying playback speeds and to permit a playback picture output of natural motion to be produced during varying speed reproduction even at the low speed.

The present invention also provides a reproducing apparatus for reproducing digital video signals from a magnetic tape, in which the digital video signals encoded by adaptively switching between intra-picture coding and inter-picture predictive coding are recorded on plural tracks on the magnetic tape in accordance with the azimuth recording system, and in which a first area having the encoded digital video signals directly recorded thereon, a plurality of second areas in each of which data as part of the digital video signals is recorded as first data for varying speed reproduction and a plurality of third areas in each of which the motion vector of data as part of the input data obtained by inter-picture predictive coding is recorded as second data for varying speed reproduction, are provided in each track. The first data and the second data for varying-speed reproduction are repeatedly recorded on a number of tracks of the same azimuth corresponding to the number of speed multiples of the maximum varying playback speed.

The data reproduced from the first area, first data for varying-speed reproduction reproduced from the second area and second data for varying-speed reproduction reproduced from the third area are separated by data separating means. The first data for varying speed reproduction, reproduced from the second area, is accumulated in the first storage means.

The second data for varying speed reproduction, reproduced from the third area, is accumulated in the second storage means, and the data reproduced from the first area is outputted during normal reproduction, while the first data for varying speed reproduction read out from the first storage means and the second data for varying speed reproduction read out from the second storage means are outputted during the varying speed reproduction whereby varying speed reproduction may be achieved with plural varying playback speeds and a playback picture output with spontaneous motion may be achieved even with a low varying playback speed.

Thus, with the recording apparatus, recording/reproducing apparatus or the reproducing apparatus for digital video signals, the ATV signals, for example, recorded directly on the recording medium, may be easily reproduced with plural varying playback speeds.

DESCRIPTION OF THE PREFERRED EMBODIMENTS

Figure 1:
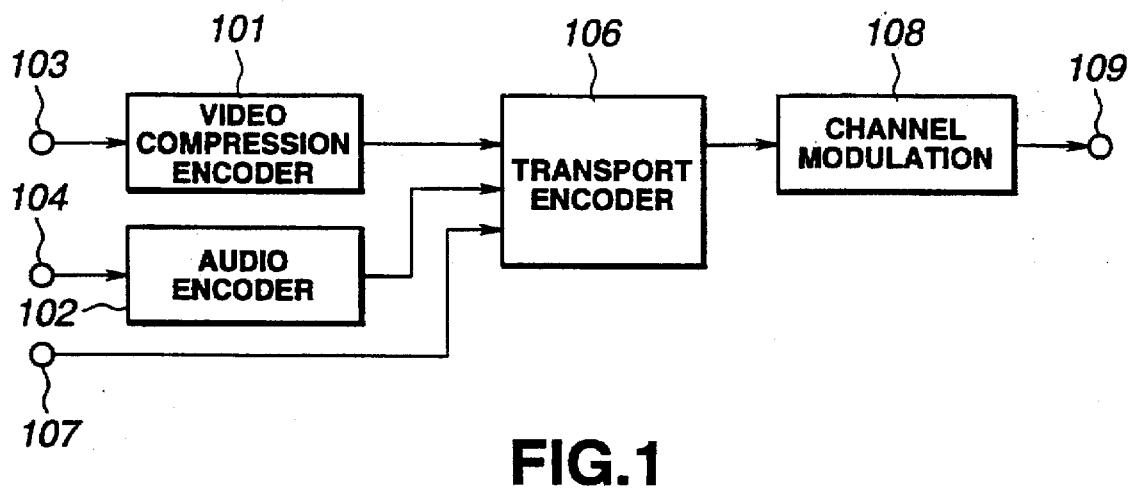
FIG. 1 is a block diagram showing the constitution of a transmission system of an ATV system.
Figure 2:
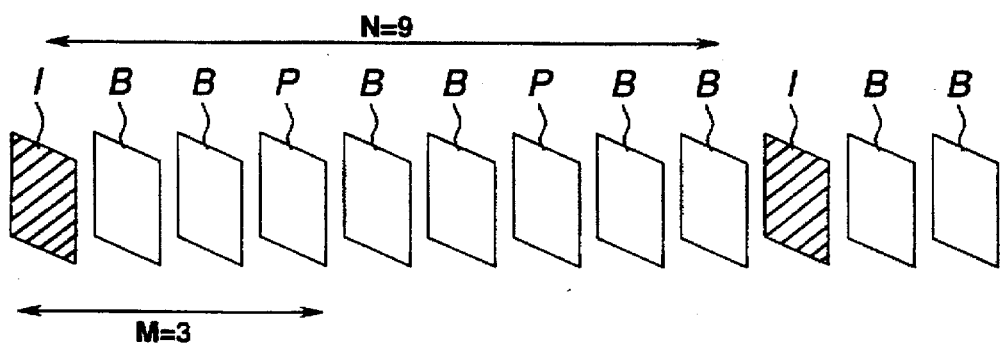
FIG. 2 shows the constitution of a GOP in an MPEG system.
Figure 3:
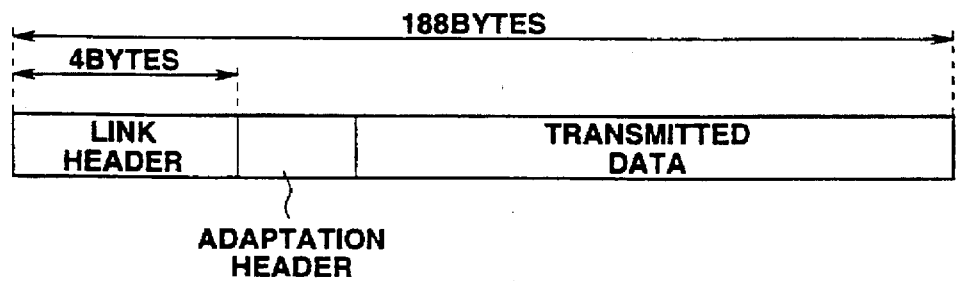
FIG. 3 illustrates the constitution of a packet in an ATV system.
Figure 4:
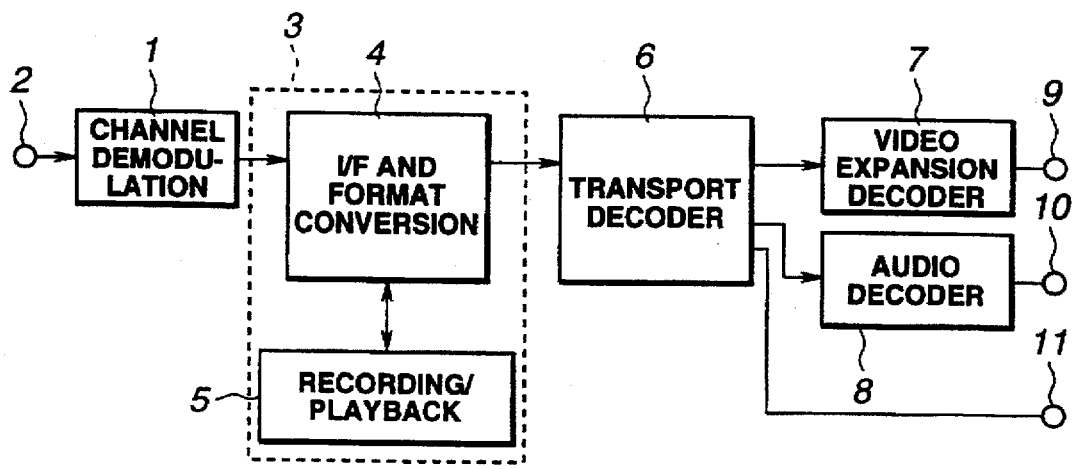
FIG. 4 is a block diagram showing the constitution of a video recording/reproducing system according to the present invention.

Referring to the drawings, illustrative embodiments of a recording apparatus, a recording/reproducing apparatus and a reproducing apparatus for digital video signals according to the present invention will be explained in detail. FIG. 4 shows, in a block diagram, the constitution of a video recording/reproducing system employing a digital VTR 3 according to the present invention. In FIG. 4, 1 denotes a channel demodulator fed with signals of the ATV system, that is modulated transmission data, via an input terminal 2. The channel demodulator 1 demodulates modulated transmission data and reproduces packeted transmission data.

The digital VTR 3 of the inclined azimuth recording system includes an interfacing and format converting unit 4 and a recording/playback unit 5. The packeted data from the channel decoder 1 is supplied via the interfacing and format converting unit 4 to a transport decoder 6, while being supplied to the recording/playback unit 5. The data transferred from the interfacing and format converting unit 4 to the recording/playback unit 5 is recorded by a rotary head of the recording/playback unit 5 on a magnetic tape. The interfacing and format converting unit 4 formats data sent to the recording/playback unit 5 so that the playback picture on varying speed reproduction of the data recorded by the recording/playback unit 5 will be optimum, as will be explained subsequently.

The recording/playback unit 5 compresses the video signals by DCT and variable length coding and records the compressed data by the rotary head on the magnetic tape. That is, with the recording/reproducing unit 5, it is possible to set an SD mode for recording video signals of the NTSC system or an HD system for recording HDTV signals. For directly recording the signals of the ATV system supplied via the interfacing and format converting unit 4, that is transmitted data, recording/playback unit 5 is set to the SD mode.

The transport decoder 6 corrects packeted data supplied thereto via the interfacing and format converting unit 4 for errors, while taking out data and the subsidiary information from the packet. The decoders 7 and 8 denote a video expansion decoder and an audio decoder, respectively. The video expanding decoder 7 operates in accordance with the MPEG system for decoding the Huffman codes and for effecting inverse DCT for expanding data supplied thereto for forming base-band signals of the HDTV system. The video expanding decoder 7 and the audio decoder 8 are fed with an output of the transport decoder 6. The video expanding decoder 7 expands transmitted data and converts the expanded data into analog signals to constitute HDTV signals. The HDTV signals thus constituted are outputted at an output terminal 9. On the other hand, the audio decoder 8 decodes audio data to constitute audio data which is outputted at an output terminal 10. The auxiliary information outputted by the transport decoder 6 is outputted at an output terminal 11.

Figure 5:
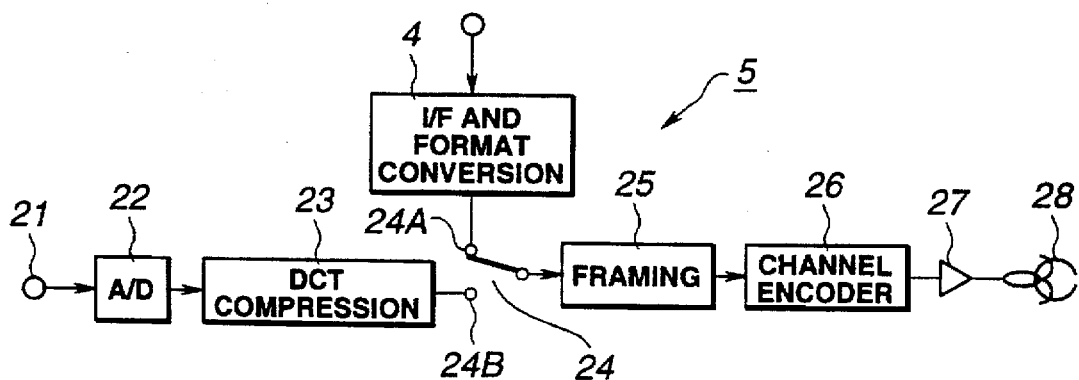
FIG. 5 is a block diagram showing the constitution of a recording system of a digital VTR according to the present invention.

Referring to FIG. 5, which is a block diagram showing the constitution of the recording system of the digital VTR 3 embodying the present invention, the numeral 21 denotes an input terminal for video signals of the current television system, such as those of the NTSC system. For recording video signals supplied from outside, component video signals of the video signals of the current television system or HDTV signals are fed to an input terminal 21. The component video signals from the input terminal 21 are sent to an A/D converter 22 where the component video signals are converted into digital signals.

The input video signals are encoded by DCT, quantization and variable length coding by way of data compression. That is, the component video signals, converted into digital signals by the A/D converter 22, are sent to a DCT compression circuit 23, so as to be blocked, shuffled and orthogonally transformed by DCT. The data resulting from the DCT circuit 23, that is DCT coefficients, are buffered by a pre-set buffer unit. The total quantity of the buffer-based codes is estimated and an optimum quantization table which will give the total code quantity less than a pre-set value is determined and quantization is carried out with this optimum quantization table. The quantized data is variable-length coded and framed.

A switching circuit 24 is switched between recording the transmitted signals of the ATV system and recording the video signals from the input terminal 21. The signals of the ATV system are supplied via the interfacing and format converting unit 4 to a terminal 24A of the switching circuit 24. An output of the DCT compression circuit 23 is supplied to a terminal 24B of the switching circuit 24. For recording the transmitted ATV system signals, the switching circuit 24 is set to a fixed terminal 24A. For recording the video signals from the input terminal 21, the switching circuit 24 is set to a fixed terminal 24A.

A framing circuit 25 frames recording data fed via the switching circuit 24 into a pre-set sync block at the same time as it performs encoding for error correction. The numeral 26 denotes a channel encoder. An output of the framing circuit 26 is fed via a recording amplifier 27 to a rotary head 28. The video signals, the HDTV signals from the input terminal 21, recorded in a compressed state on a magnetic tape, not shown, or the signals of the ATV system from the input terminal 2, are recorded by the rotary head 28 on the magnetic tape, not shown.

That is, for recording the transmitted ATV system signals by the above-described recording system, the switching circuit 24 is set to its terminal 24A, as a result of which the ATV signals entering the recording system via the interfacing and format converting unit 4 are framed by the framing circuit 25 and demodulated by a channel encoder 26, thus steping down the frequency of the input video signals, so as to be recorded on the magnetic tape by the rotary head 28.

For recording the video signals from the input terminal 21, the switching circuit 24 is set to its terminal 24B, as a result of which the video signals from the input terminal 21 are encoded and compressed by the DCT compression circuit 23, framed by the framing circuit 25 and demodulated by the channel encoder 26 so as to be recorded on the magnetic tape by the rotary head 28.

During recording of the ATV signals, the interfacing and format converting unit 4 arrays data so that I-picture data as first data for varying speed reproduction and the motion vector of the P-picture as second data for varying speed reproduction will be recorded in a trick play area which is an area that can be reproduced during the varying-speed reproduction, thereby improving the picture quality of the varying-speed reproduced picture as will be explained subsequently. During the varying-speed reproduction, the data of the I-picture and the motion vector of the P-picture are read out from the trick play area and decoded.

Figure 6:
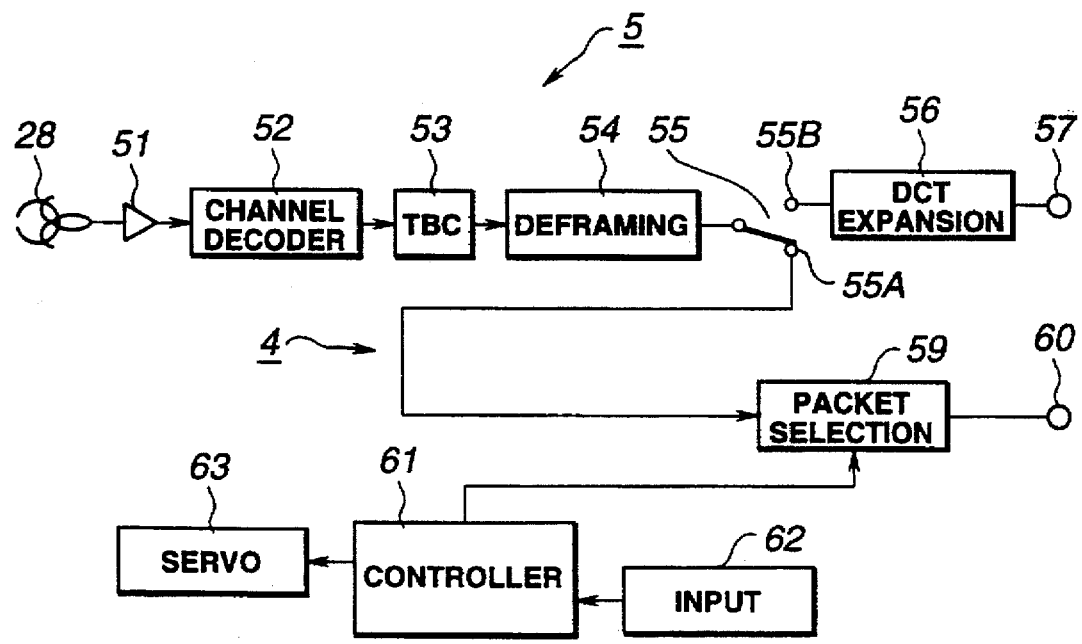
FIG. 6 is a block diagram showing the constitution of a reproducing system of the digital VTR.

Referring to FIG. 6, showing the constitution of the playback system of the digital VTR 3, the signals recorded on the magnetic tape are reproduced by the rotary head 28 and supplied via a playback amplifier 51 to a channel decoder 52 which then demodulates the playback signals in accordance with a demodulating system associated with the modulating system of the channel encoder 26 of the above-described recording system.

A time base corrector (TBC) 53 frees the playback signals of jitter. That is, the TBC 53 is supplied with write clocks based on playback signals and readout clocks based on a reference signal, while being fed with an output of the channel decoder 52, so that the TBC 53 frees the playback signals of jitter. A deframing circuit 54 is associated with the framing circuit 25 of the recording system and corrects for errors in the playback data from the TBC 53. A switching circuit 55 is configured for switching between reproduction of the ATV signals and reproduction of the component video signals. An output of the deframing circuit 54 is fed to the switching circuit 55. If the playback signals are ATV signals, the switching circuit 55 switches to a fixed terminal 55A. If the playback signals are component video signals, the switching circuit 55 switches to a fixed terminal 55B.

A DCT expansion circuit 56 is associated with the DCT compression circuit 23 of the recording system. That is, the DCT expansion circuit 56 decodes and inverse discrete cosine transforms the variable length codes as the playback data for expanding the component video signals recorded in the compressed state to the original base-band video signals. That is, an output of the terminal 55B of the switching circuit 55 is fed to the DCT expansion circuit 56 which restores the playback data to base-band video signals which are outputted at an output terminal 57.

An output of the terminal 55A of the switching circuit 55 is fed to a packet selection circuit 59. During normal reproduction of the ATV system signals, the packet selection circuit 59 selects all of the packets of the playback data supplied via the switching circuit 55. During varying-speed reproduction, the packet selection circuit 59 selects and outputs a packet of the motion vector of the P-picture and data of the I-picture obtained on reproducing the trick play area. An output of the packet selection circuit 59 is issued at an output terminal 60.

A controller 61 manages switching between normal reproduction and varying speed reproduction. The controller 61 is fed with a mode setting signal from an input unit 62. The servo circuit 63 and the packet selection circuit 59 are controlled responsive to the mode setting signal. During varying-speed reproduction of the ATV signals, a servo circuit 63 causes the phase information to be taken into account in tape speed control by taking advantage of tracking signals, so that the phase relation between the head tracing and the track traced by the head is maintained to be perpetually constant. That is, the phase is fixed in order to permit the head to trace the trick play area in the track. That is, during the varying-speed reproduction, the trick play area is reproduced for reproducing data of the I-picture and the motion vector of the P-picture recorded in the trick play area.

An output of the output terminal 60 is sent to and decoded by the video expanding decoder 7 shown in FIG. 4. In the present embodiment, data of a full I-picture and the motion vector of the P-picture are recorded in the trick play area. Consequently, during the varying-speed reproduction, actual pictures are updated on the picture basis and the motion vector is also updated so that a varying-speed reproduced picture which is comfortable to see and exhibits natural motion may be reproduced.

Figure 7:
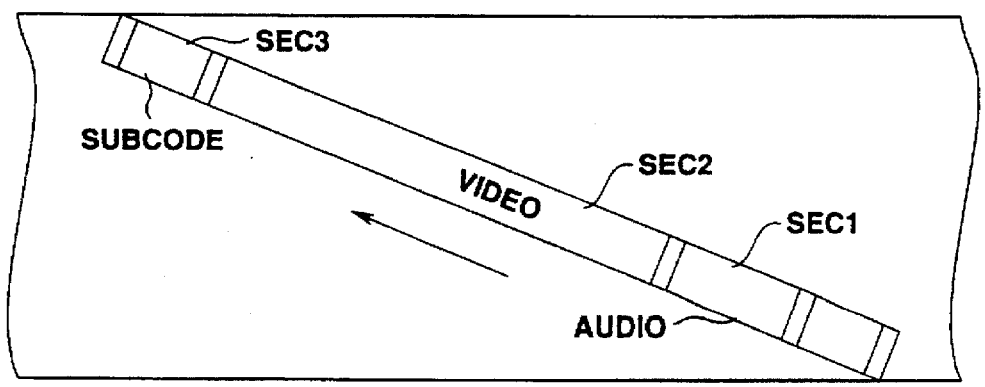
FIG. 7 illustrates a track constitution on a magnetic tape employed in the digital VTR.
Figure 8:
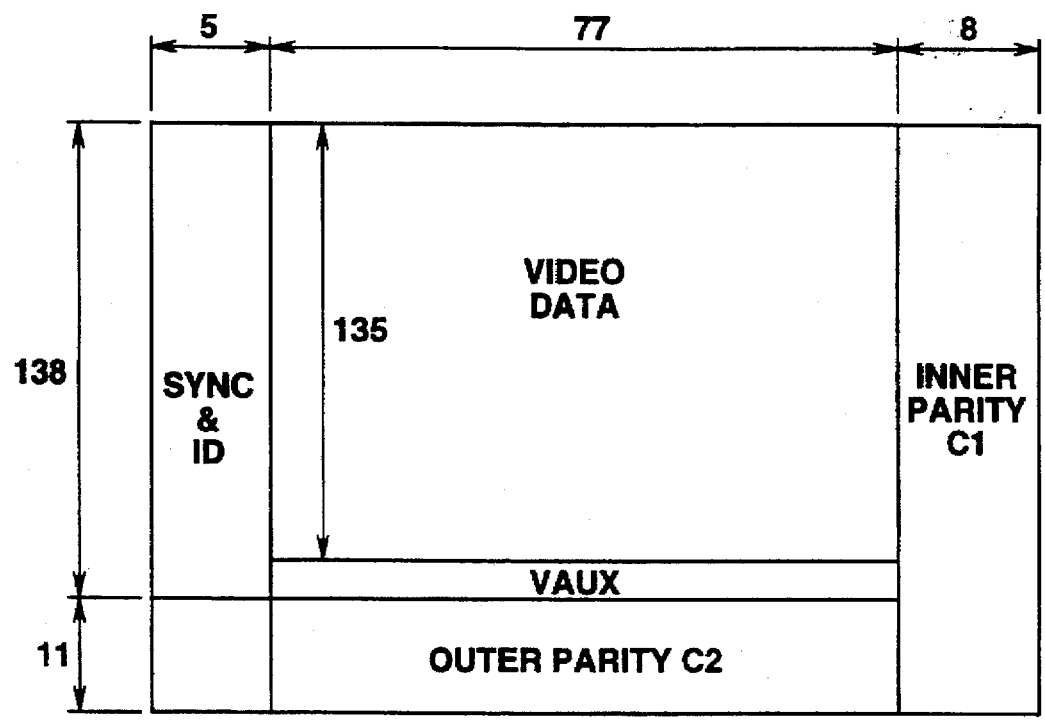
FIG. 8 illustrates the constitution of a video sector.
Figure 9:
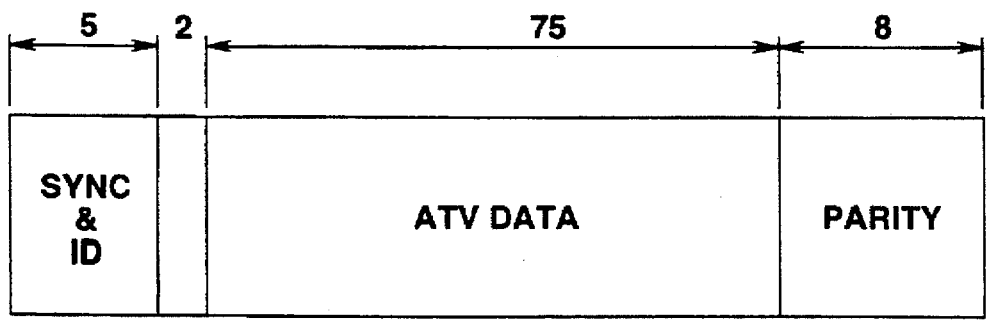
FIG. 9 illustrates the constitution of a sync block.

The varying-speed reproduction in the digital VTR embodying the present invention is explained in detail. FIG. 7 shows a constitution of one track of the digital VTR. Each track is constituted by an audio sector SEC 1, a video sector SEC 2 and a sub-code sector SEC 3. The video sector SEC 2 has a capacity of 135 sync blocks of video data, as shown in FIG. 8. The leading end of each sync block has 5 bytes of sync and ID. To these video data are appended spare data (VAUX) equivalent to three sync blocks. Error correction codes (C1 and C2) are appended in duplicated fashion using product codes.

Video data equivalent to 135 sync blocks are recorded in the one-track video sector SEC 2. For the SD mode, the rpm of a rotary drum is 150 Hz. Two heads with different azimuth angles are arranged on the rotary drum and data is azimuth-recorded on ten tracks per frame. If 75 of 77 bytes of the data area in each sync block are used for data recording, the data rate that may be used for recording is $77 \times 8 \times 135 \times 10 \times 30 = 24.948$ Mbps.

On the other hand, the data rate for the ATV signals is approximately 19.2 Mbps. Therefore, if the transmitted ATV signals are recorded with the SD mode, $19.2 \times 106/300/77/8 = 104$ sync blocks are used for recording the entire bitstream as a recording area for normal reproduction. The remaining area, that is 135−104=31 sync blocks, may be used as the trick play area. Therefore, if the ATV signals are recorded with the SD mode for improving the picture quality during varying-speed reproduction, the I-picture data and the motion vector for the P-picture are recorded in a duplex manner as data required for varying-speed reproduction. In the present embodiment, the I-picture data recorded in the spare recording area (allowance recording area) is the data for the I-picture (low-range coefficient data of the I-picture) in their entirety. This permits picture updating on the picture basis during varying-speed reproduction.

Figure 10:
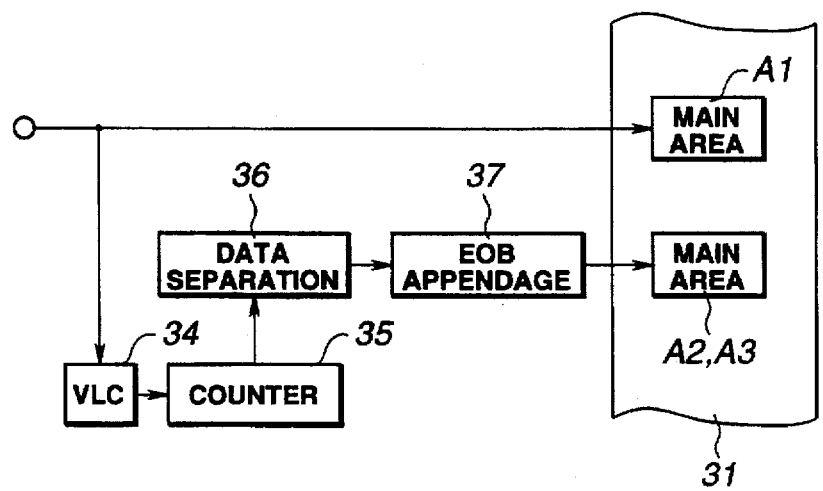
FIG. 10 is a block diagram for illustrating the principle of the recording operation in the digital VTR.

FIG. 10 schematically shows the recording/reproduction of ATV signals. A video sector SEC 2 of a magnetic tape 31 has a main area A1 and a trick play area A2. The trick play area A2 corresponds to the allowance recording area which is provided in an area reproducible during the varying-speed reproduction. During recording, the bitstream of the input ATV signals or data stream is directly recorded in the main data area A1, while being supplied to a VLC decoding circuit 34. The VLC decoding circuit 34 decodes the ATV signals and detects the interruption in the variable-length encoded DCT coefficients. An output of the VLC decoding circuit 34 is fed to a counter 35, which counts the number of the DCT coefficients in order to detect a data portion required for varying-speed reproduction. An output of the counter 35 is supplied to a data separating circuit 36, which then extracts, based upon an output of the counter 35, the data portion of the input bitstream which is required for varying-speed reproduction.

The data portion required for varying speed reproduction comprises low-range coefficients of the respective blocks of the I-picture and the motion vector of the P-picture in the ATV signals. This data portion is extracted from the input bitstream by the data separating circuit 36 so as to be supplied to an EOB (end of block) appending circuit 37. The data required for varying-speed reproduction is recorded in the trick play areas A2 and A3.

During normal reproduction, the reproduced signals from the main area A1 are decoded. During the varying-speed reproduction, the trick play areas A2, A3 are reproduced and decoded. Consequently, during the varying-speed reproduction, the low-range coefficients of the respective blocks of the I-picture and the motion vector of the P-picture are transmitted to the video expanding decoder 7. In order for the data thus transmitted to the video expanding decoder 7 to be decoded by an ordinary video expanding decoder, the construction of the transmitted data needs to be the same as that of the ordinary bitstream. Therefore, an end-of-block EOB indicating the end of a block is appended after extracting low-range components from the respective blocks during recording.

The method for determining the trick play area for recording data for varying-speed reproduction is now explained. If, from the relation between respective data rates, the recording rate for the digital VTR is 24.948 Mbps and the data rate of the ATV signals is 19.2 Mbps, $135 \times (19.2 \cdot 24.948) = 104$ sync blocks of the video sector of each track is employed for recording data for normal reproduction.

Figure 11:
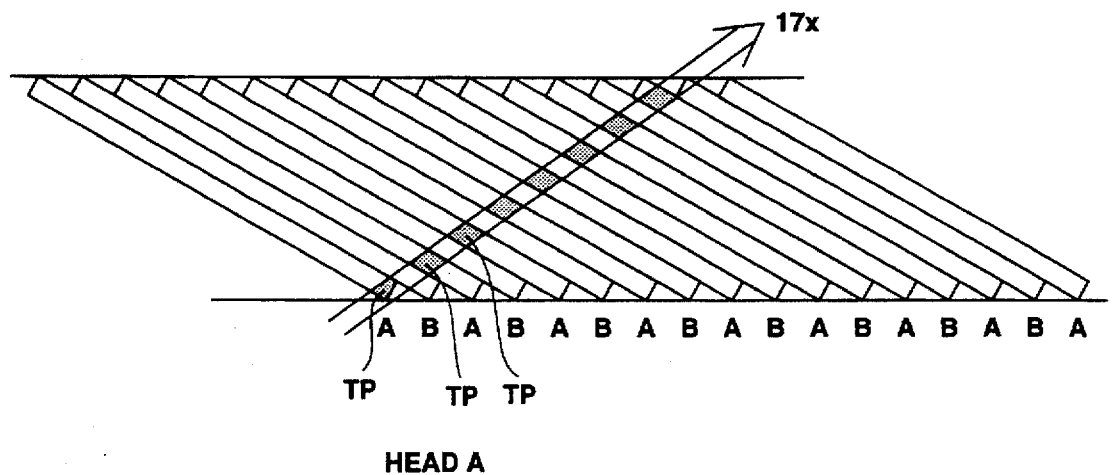
FIG. 11 shows an illustrative example of a trick play area.
Figure 12:
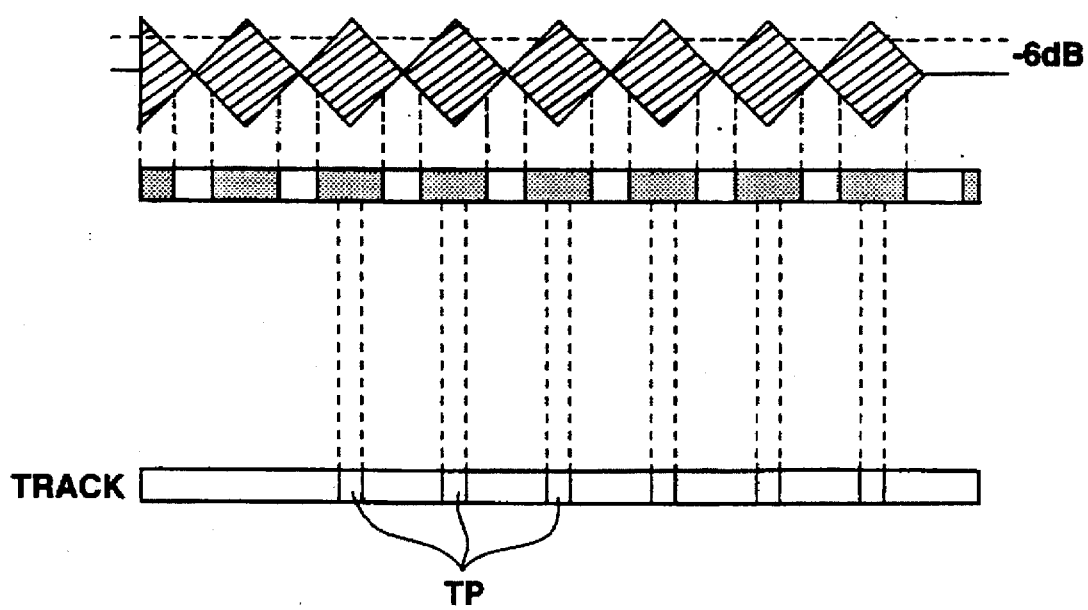
FIG. 12 illustrates a waveform of playback signals during varying-speed reproduction.

135−104=31 sync blocks may be employed for recording data for varying-speed reproduction as the trick play area. FIG. 11 shows the trajectory of a head A of two heads A and B having different azimuths during the varying-speed reproduction of e.g., 17-tuple speed. As shown in FIG. 11, if it is the head A that is tracing, an area denoted by TP can be reproduced. This reproducible area TP is utilized as the trick play area for recording data for varying-speed reproduction. With a helical scan azimuth-recording VTR, data reproduced from the reproducible area TP is necessarily burst-like, as shown in FIG. 12. This data is necessarily reproduced if the position of the reproducible area TP is fixed by e.g., ATF and the data for varying-speed reproduction is recorded in this reproducible area.

With the present embodiment, the trick play area is determined in the following manner.

Figure 13A:
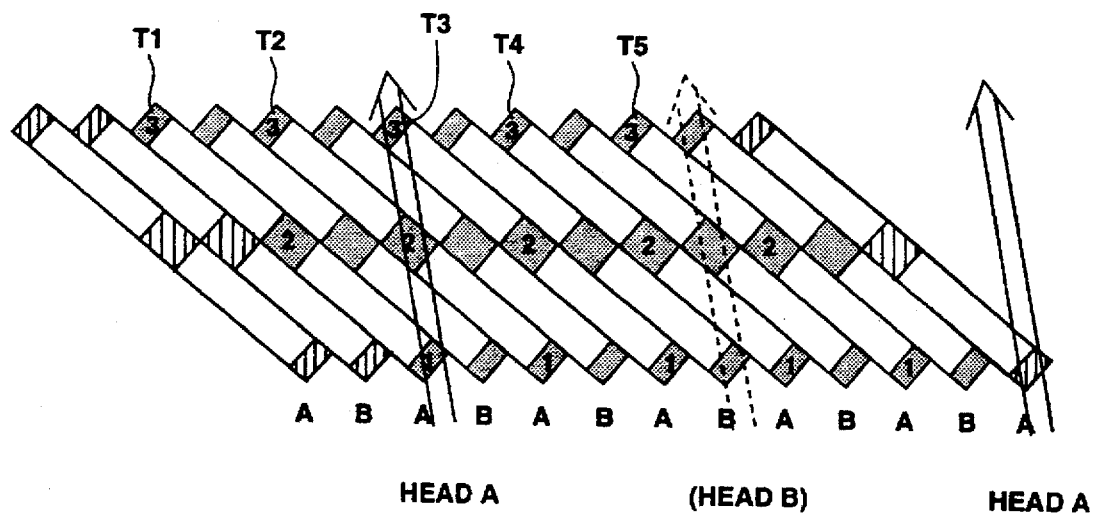
FIGS. 13A and 13B shows an illustrative example of a trick play area.
Figure 13B:
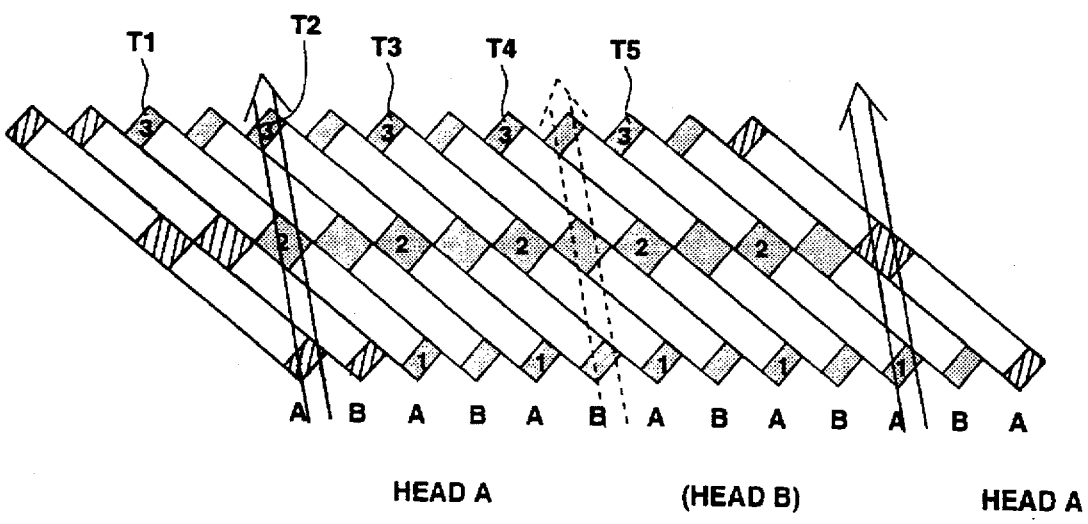

If the maximum speed of the magnetic tape during varying-speed reproduction is set to an odd-number multiple of the normal playback speed, that is to (2N+1)tuple speed, where N is an integer, the area that is reproducible when the tape is reproduced at this maximum speed is the trick play area. In FIG. 11, the maximum speed at the time of varying-speed reproduction is set to a 17-tuple speed which is an odd-number multiple of the normal playback speed. The area that is reproducible on reproduction with the 17-tuple speed is selected to be the trick play area TP. In this trick play area TP is recorded data for varying-speed reproduction, referred to herein as trick play data. Also the same trick play data is repeatedly recorded on a number of the same azimuth tracks equal to the multiple speed number of the maximum speed during the varying speed reproduction. For example, if the maximum speed during the varying speed reproduction is 5-tuple speed, the multiple speed number is five, so that the trick play data is repeatedly recorded on the five tracks T1 to T5 of the azimuth A as shown in FIGS. 13A and 13B.

Figure 14:
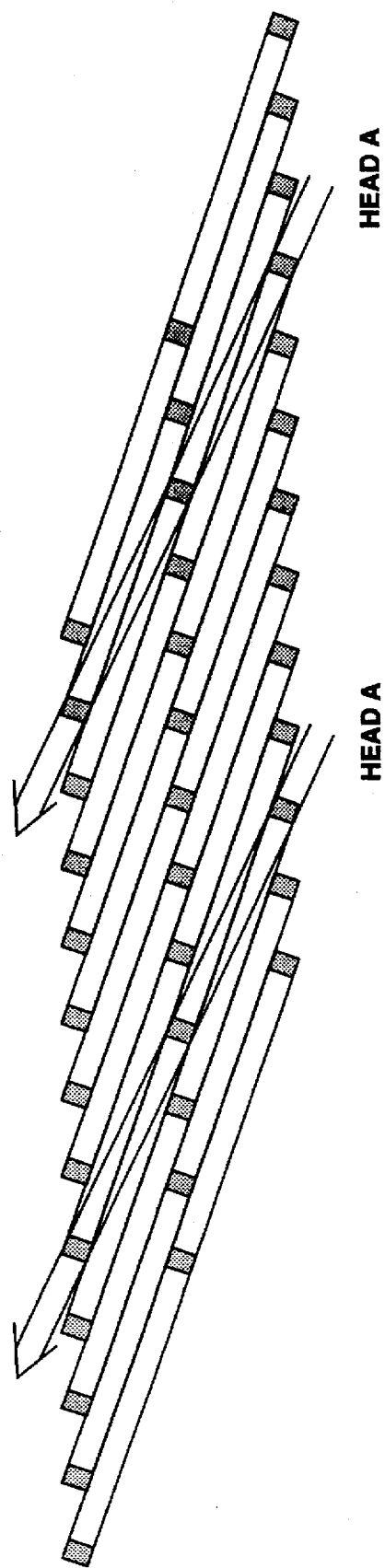
FIG. 14 shows a head trajectory for illustrating the operation during varying-speed reproduction.
Figure 15A:
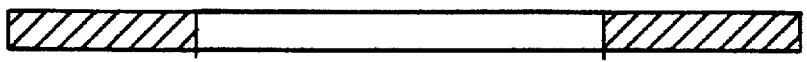
FIG. 15 shows data reproduced during each scan for illustrating the operation during the varying-speed reproduction.
Figure 15B:

If the trick play areas are set as described above, the varying-speed reproduction with the (N+0.5)tuple speed, such as 1.5-tuple, 2.5-tuple, 3.5-tuple speed, . . . becomes possible as is the reproduction with the maximum speed of varying-speed reproduction. In other words, if the tape speed during varying-speed reproduction is set to (N+0.5)tuple speed, such as 1.5-tuple, 2.5-tuple, 3.5-tuple speed, . . . all portions of the tracks of the same azimuth can be reproduced with two scans, as shown in FIGS. 14 and 15. FIG. 14 shows the trajectory of the head A when varying-speed reproduction is done at the 3.5-tuple speed, with the maximum varying reproducing speed being 7-tuple speed. In this case, both end portions of the track of the azimuth A are reproduced by the first scan, as shown in FIG. 15A, while the mid portion of the track of the azimuth A is reproduced by the second scan, as shown in FIG. 15B, so that all portions of one track of the azimuth A are reproduced by these two scans. Therefore, if the same trick play data is repeatedly recorded in each track of the azimuth A, all data of the one track of the azimuth A may be reproduced by these two scans.

Therefore, by setting the maximum speed at the time of varying-speed reproduction is set to (2N+1)tuple speed, the trick play data can be reproduced at the (2N+1)tuple speed, 1.5-tuple speed, 2.5-tuple speed, ... and (N+0.5)tuple speed, so that varying-speed reproduction becomes possible with these speeds. For reverse reproduction, the (2N−1)tuple speed is the maximum speed.

Thus, if the maximum sped during the varying-speed reproduction is (2N+1)tuple speed, and the area traced by the head with this maximum speed is selected to be the trick play area, while a number of the same trick play data equal to the multiple speed number of the maximum speed is repeatedly recorded, the varying-speed reproduction with 1.5-tuple speed, 2.5-tuple speed, ... (N+0.5)tuple speed becomes possible in addition to the varying-speed reproduction at the maximum varying playback speed.

If the maximum varying-speed reproducing speed is the 17-tuple speed, each burst-like area traced by the head A in FIG. 11 is of a length corresponding to 13 sync blocks. If, in consideration of various margins, the 4-sync blocks make up a trick play area, 4×8=24 sync blocks can be procured as the trick play area on one track. If the data for varying speed reproduction is repeatedly recorded as described above, since the one-picture trick play data is recorded at the time of recording, the varying-speed reproduced data is updated on the picture basis. On the other hand, since the data rate is lowered by extracting low-range components of the I-picture as the trick play data, each picture is deteriorated in resolution. Thus it is the picture updating ratio that differs from one varying playback speed to another. For example, if the maximum varying reproducing speed is the 17-tuple speed, and the trick play area corresponds to the 14-sync blocks as described above, the data rates at the time of reproduction becomes equal to 77×8×24×300×(17/17)=4.44 Mbps, 77×8×24×300×(9/17)=2.35 Mbps and 77×8×24×300×(4/17)=1.04 Mbps, for the 17-tuple speed, 9-tuple speed and for the 4-tuple speed, respectively.

If, with the ATV system, the input signal is HD, the picture size is 1920×1080 for luminance and one-half the size for the color difference, the size of the I-picture after compression to 18.8 Mbps is on the order of 2 Mbps. If six low-range side DCT coefficients are extracted as the trick play data from the I-picture size following the compression, the size is on the order of 1.3 Mbits for usual pictures. If these data are transmitted on the frame basis, the data rate is 1.3×30=39 Mbps. Thus the picture is frozen for a time corresponding to 39/4.44=8.88 frames, 39/2.35=16.6 frames and 39/1.04=37.5 frames on an average for the 17-tuple, 9-tuple and 4-tuple speeds, respectively. Thus the picture is unnatural in motion due to the lower picture updating rate especially at the lower speed.

In this consideration, data of the I-picture is recorded as first data for varying-speed reproduction in plural trick play areas on each track, while the motion vector of the P-picture is recorded as the second data for varying-speed reproduction.

Figure 16:
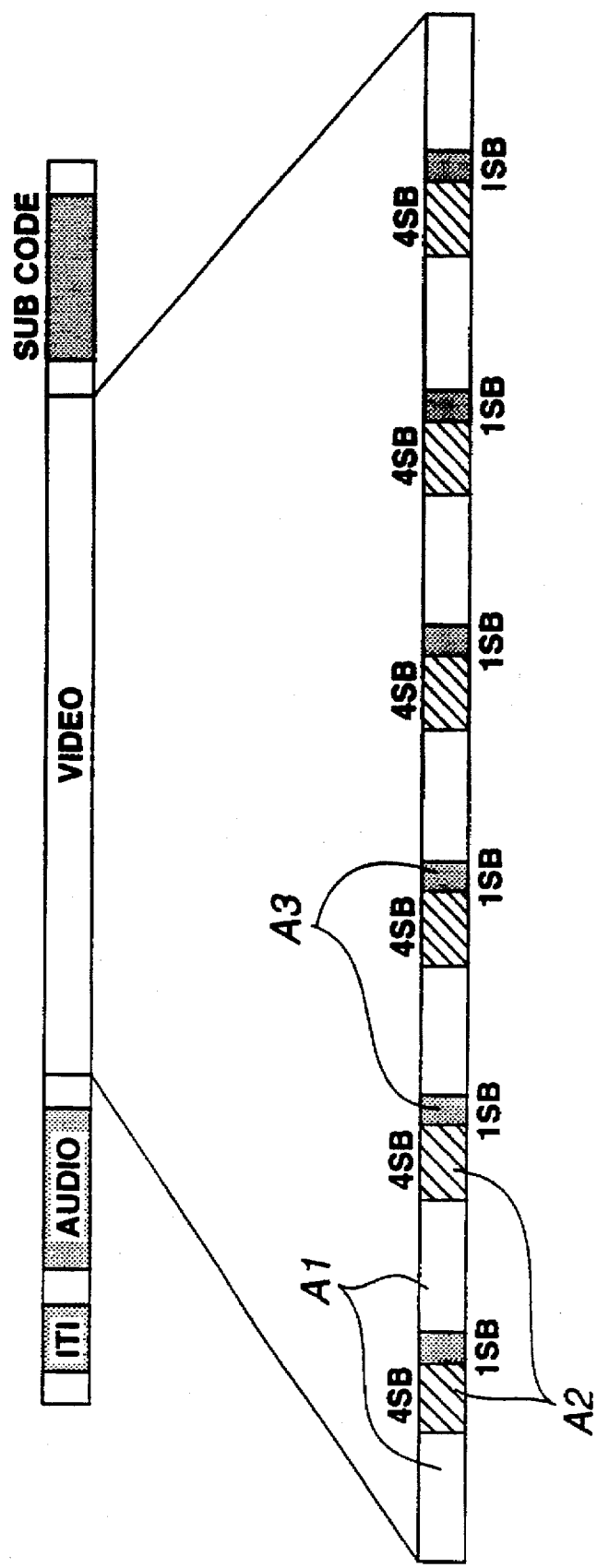
FIG. 16 illustrates an alternative example of illustrative recording contents of the trick play area.

With the reproducing speed not higher than the (N+0.5) tuple speed, all data on the track is reproduced by two scans, so that, if the second trick play data is recorded in duplicate in a second area A3 other than the second area A2 on which the data of the I-picture is recorded, as shown in FIG. 16, the data is necessarily reproduced with the playback speed not more than the (N+0.5)tuple speed.

The maximum number of sync blocks of the trick play area TP is 31, of which 24 sync blocks are used as the first trick play data and six of the remaining sync blocks (31−24=7 sync blocks) are used for recording the second trick play data. As the second trick play data, the P-picture less the header and the motion vector is employed. The purpose of extracting the motion vector but not the DCT coefficients from the P-picture is to lower the data rate. This enables even six sync blocks to be recorded satisfactorily.

During varying-speed reproduction, data made up only of the I-picture recorded in the first trick play area is reproduced for the maximum varying reproduction speed of (2N+1)tuple speed, while only the data composed only of the I-picture recorded in the first trick play area A1 and the motion vector of the P-picture recorded in the second trick play area A3 are reproduced for the speed lower than the (N+0.5)tuple speed, for thereby raising the updating ratio. Although only the motion vector is available as P-picture data, the picture is felt to be sufficient in picture quality since the picture is varying-speed reproduced picture.

Thus, during the varying speed reproduction, the trick play data recorded in duplicate in the trick play area is necessarily reproduced. The reproduced data of the trick play area is a burst-like picture. The trick play data reproduced from the trick play area during the varying speed reproduction is sent to the video expanding decoder 7. Since the playback data is burst-like, an error code is inserted into a data-free time interval. Thus the data for the data-free time interval is disregarded by the video expanding decoder 7.

The illustrative construction of the interfacing and format converting unit 4, framing circuit 25, deframing circuit 54 and the packet selection circuit 59, making up the digital VTR, is explained. The circuits having the same function as that of those shown in FIGS. 4, 5, 8 and 10 are depicted by the same numerals and are not explained for clarity.

Figure 17:
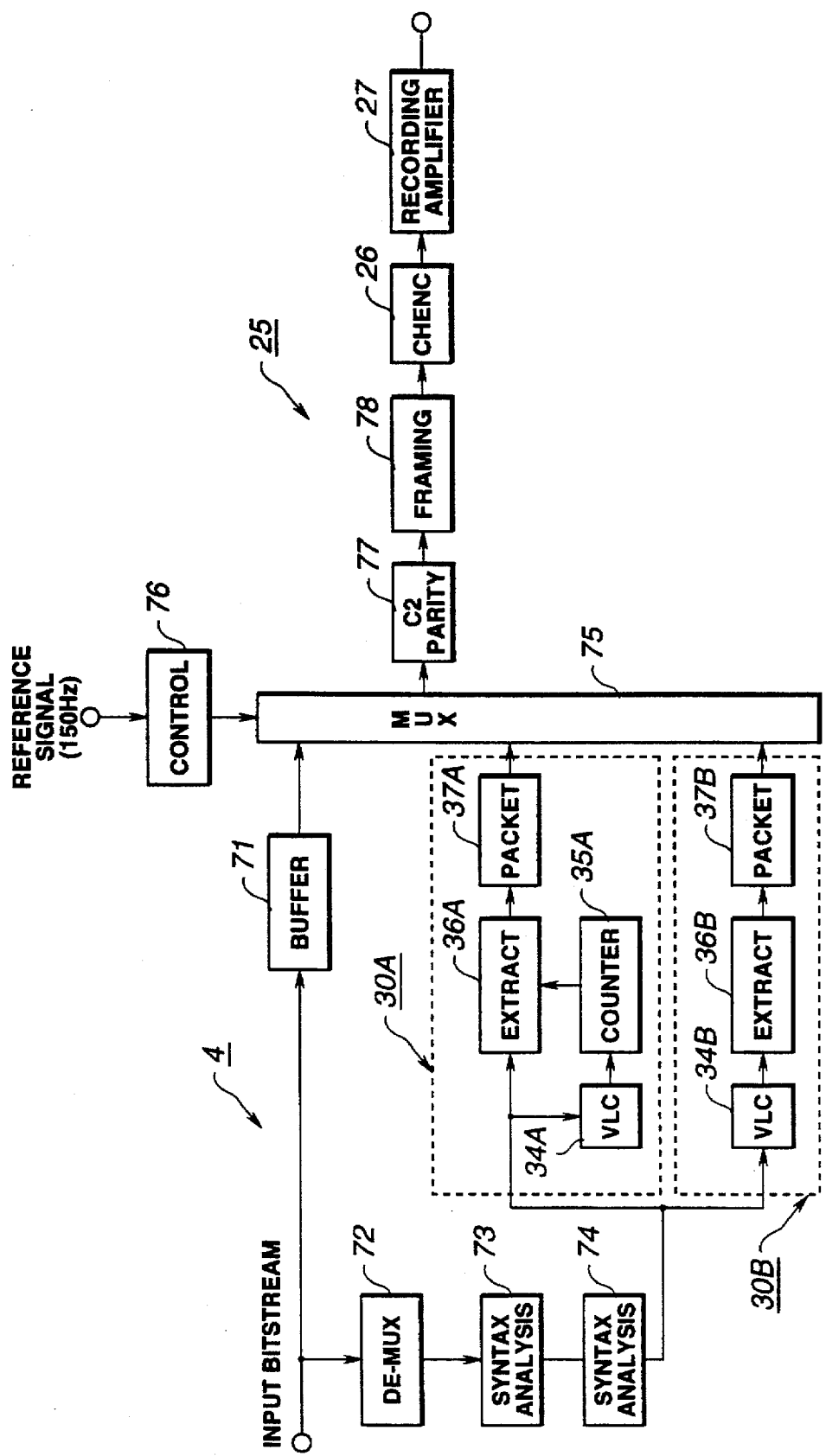
FIG. 17 is a block diagram showing an illustrative example of a recording system of the digital VTR.

Referring to FIG. 17, the interfacing and format converting unit 4, constituting the recording system of the digital VTR 3, includes a buffer memory 71 for temporarily storing ATV signals, and a demultiplexor 72 for extracting a packet of video signals from the ATV signals. The interfacing and format converting unit 4 also includes a depacketing circuit 73 for resolving the packets of video signals from the demultiplexor 72 into respective packets and a syntax analysis circuit 74 for analyzing the header of each packet for extracting data of the I-picture and data of the P-picture. The interfacing and format converting unit 4 also includes a first trick play data extracting unit 30A supplied with data of the I-picture extracted by the syntax analysis circuit 74 and a second trick play data extracting unit 30B supplied with data of the P-picture extracted by the syntax analysis circuit 74. Finally, the interfacing and format converting unit 4 includes a multiplexor 75 for time-divisionally multiplexing the ATV signals read out from the buffer memory 71 and the first and second trick play data supplied from the first and second trick play data extracting units 30A and 30B, and a control circuit 76 for controlling the multiplexor 75.

The first trick play data extracting unit 30A includes a VLC (Variable Length Code) decoding circuit 34A for detecting the interruption in the DCT coefficients in the I-picture data extracted by the syntax analysis circuit 74, and a counter 35A for counting the number of the DCT coefficients. The first trick play data extracting unit 30A also includes a data separating circuit 36A for extracting he first trick play data and an EOB appending circuit 37A for appending the EOB data to the first trick play data.

The second trick play data extracting unit 30B includes a VLC decoding circuit 34B for decoding data of the P-picture extracted by the syntax analysis circuit 74, a data separating circuit 36B for extracting the second trick play data and an EOB appending circuit 37A for appending the EOB data to the second trick play data.

When extracting the first and second trick play data required for varying speed reproduction from the ATV signals and time-divisionally multiplexing the trick play data into ATV signals for constituting recording data, the interfacing and format converting unit 4 provides for a distance between the recording start position and the trick play area on each track which differs from a track to a neighboring track.

That is, the buffer memory 71 transiently stores the input ATV signals and reads out the stored ATV signals on e.g., the sync block basis in order to supply the read-out data to the multiplexor 75. On the other hand, the demultiplexor 72 extracts the packet of video signals from the ATV signals and transmits the extracted packet to a depacketing circuit 73 which then resolves the packets of video signals into packets. The syntax analysis circuit 74 analyzes the headers of the respective packets resolved by the depacketing circuit 73 and extracts the packets containing data of the I-picture in order to transmit them to the data separating circuit 36A. In addition, the syntax analysis circuit 74 extracts the packets containing data of the I-picture in order to transmit the packets to the data separating circuit 36B.

The first trick play data extracting unit 30A decodes the packet of the I-picture supplied from the syntax analysis circuit 74 in order to detect the interruption in the variable length encoded DCT coefficients. The counter 35 counts the number of the DCT coefficients in order to detect the low-range coefficients of data of the I-picture. The data separating circuit 36A is responsive to an output of the counter 35A to extract the first trick play data required for varying-speed reproduction, that is low-range coefficients of respective blocks of the I-picture, from the data of the packets supplied form the data separating circuit 36A, and transmits the extracted data to the EOB appending circuit 37A. The EOB appending circuit 37A appends the EOB data to the low-range coefficients of the respective blocks of the I-picture and transmits the resulting data to the multiplexor 75 on the sync block basis.

In the second trick play data extracting unit 30B, the VLC decoding circuit 34B decodes the packets of the P-picture supplied thereto from the syntax analysis circuit 74 in order to transmit the data of the P-picture to the data separating circuit 36B. The data separating circuit 36B extracts the motion vector of the P-picture as the trick play data required for varying speed reproduction and transmits the data to the EOB appending circuit 37B. The EOB appending circuit 37B appends the EOB data to the motion vector of the P-picture and transmits the resulting data to the multiplexor 75 on the sync block basis.

The multiplexor 75 time-divisionally multiplexes the ATV signals read out from the buffer memory 71 and the trick play data from the data separating circuit 36, under control by the control circuit 36, for repeatedly recording trick play data on a number of the tracks of the same azimuth corresponding to the number of multiple speeds of the maximum varying playback speed and for recording the same data on at least two trick play data.

That is, the control circuit 78 time-divisionally multiplexes the ATV signals read out from the buffer memory 71 and the first and second trick play data supplied form the first and second trick play data extracting units 30A, 30B, based upon the reference signal of e.g., 150 kHz. The recording data, thus produced on time-divisionally multiplexing the ATV signals and the first and second trick play data in this manner, are supplied via a switching circuit 24 shown in FIG. 6 to the framing circuit The framing circuit 25 includes a C2 parity circuit 77 for appending an outer parity and a framing circuit 78 for appending an inner parity, as shown in FIG. 17. The C2 parity circuit 77 appends the outer parity C2 to recording data supplied from the multiplexor 75. The framing circuit 78 appends the inner parity C1 and 5 bytes of the sync and ID in order to transmit the resulting data to the channel encoder 26.

Thus the low-range coefficients of the I-picture data extracted from the ATV signals are recorded on the first trick play area A2 as the first trick play data required for varying-speed reproduction, while the motion vector of the P-picture extracted from the ATV signals is recorded in the second trick play area A3 as the second trick play data required for varying-speed reproduction.

The deframing circuit 54, constituting the reproducing system of the digital VTR, includes a deframing circuit 81 for correcting the playback data for errors by the inner parity C1 and an error correcting circuit 82 for correcting the playback data for errors by the outer parity C2. The deframing circuit 81 corrects the playback data supplied from the channel decoder 52 via the TBC 53 shown in FIG. 7 for errors by the inner parity C1 and transmits the error-corrected playback data to an error correction circuit 82.

The error correcting circuit 82 corrects the playback data usually supplied during playback for errors by the outer parity C2. The error correcting circuit 82 does not perform error correction during the varying-speed reproduction only of ATV signals, that is, it does not correct errors of the playback data composed only of trick play data. An output of the error correction circuit 82 is supplied to the DCT expansion circuit 56 via the switching circuit 55 shown in FIG. 7 during reproduction of the component video signals, while it is supplied to the packet selection circuit 59 via the switching circuit 55 during reproduction of the ATV signals.

Figure 18:
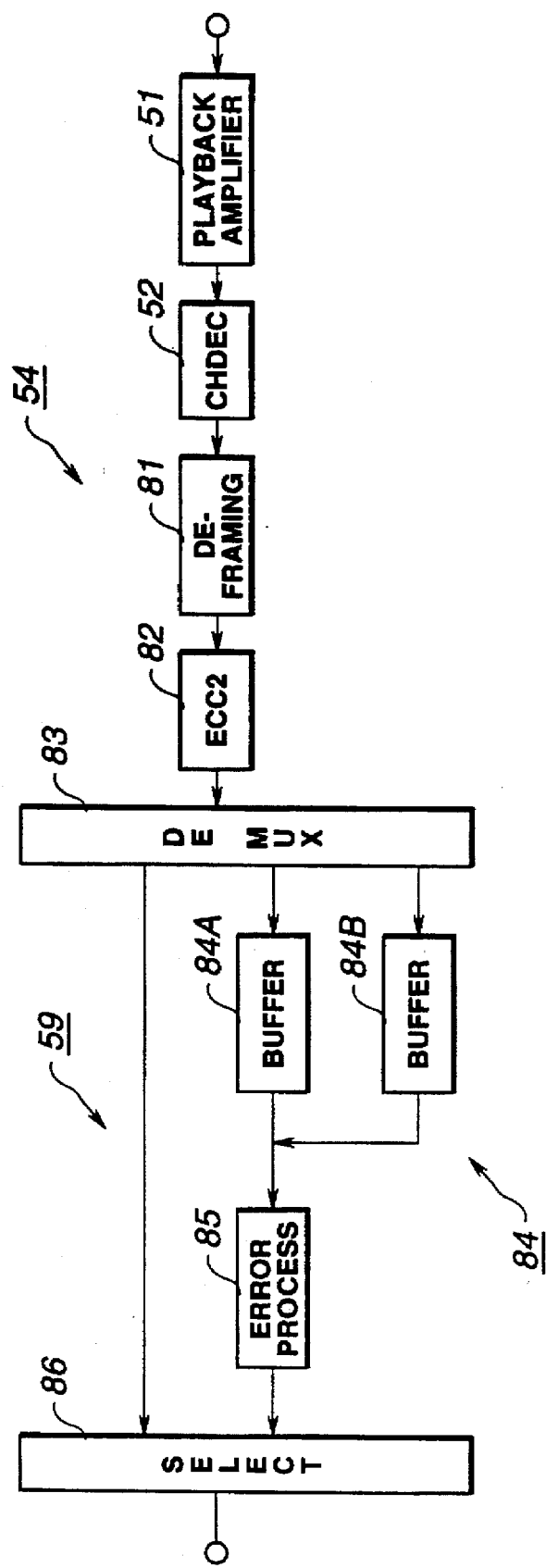
FIG. 18 is a block diagram showing an illustrative example of a reproducing system of the digital VTR.

Referring to FIG. 18, the packet selection circuit 59 includes a demultiplexor 83 for distributing the playback data between the normal reproduction and the varying-speed reproduction, and a buffer memory 84 for transiently storing playback data during the varying-speed reproduction. The packet selection circuit also includes an error processing circuit 85 for setting data not corrected for errors by the inner parity C1 to zero, and a selector 86.

The demultiplexor 83 decodes the packets of the ATV signals and, during normal reproduction of the ATV signals, sends the packets of the playback data supplied from the error correcting circuit 82 to the selector 86. During the varying speed reproduction, the demultiplexor 83 transmits the first trick play data reproduced from the first trick play area A2, that is data of the I-picture, to a buffer memory 84A, while transmitting the second trick play data reproduced from the second trick play area A3, that is the motion vector of the P-picture, to a buffer memory 84B.

The buffer memory 84A transiently stores data reproduced from the first trick play area A2 and, at a time point when data for a full picture have been stored, transmits the stored data to the error processing circuit 85. The buffer memory 84B transiently stores data reproduced from the second trick play area A3 and, at a time point when data for a full picture have been stored, transmits the stored data to the error processing circuit 85. The error processing circuit 85 sets data not corrected for errors in the deframing circuit 85 with the inner parity C1 to zero, while setting invalid data not reproduced by varying-speed reproduction to zero and transmitting data of the I-picture from the buffer memory 84 and the motion vector of the P-picture to the selector 86.

During normal reproduction of the ATV signals, the selector 86 selects the playback data directly supplied from the demultiplexor 83, during the normal reproduction of the ATV signals, while selecting the playback data supplied from the error processing circuit 85 during the varying-speed reproduction and outputting the selected data to the video expanding decoder 7 shown in FIG. 4. If, for the varying-speed reproduction, data made up only of the I-pictures recorded in the first trick play area A2 is reproduced for the (2N+1)tuple speed of the maximum varying playback speed and data composed only of the I-picture recorded in the first trick play area A2 and the motion picture vector of the P-picture recorded in the second trick play area A3 are reproduced for the playback speed lower than the (N+0.5)tuple speed, it is possible to raise the updating rate.

That is, while a single I-picture (only low-range coefficients) is recorded in the first trick play area A2, if simply the reproduced data is fed to the video expanding decoder 7, there is no assurance of the display timing (1/30 second) being coincident with the timing of the I-picture boundary, such that the actual picture is updated only partially without being updated on the picture basis. In this consideration, before the playback data is supplied to the video expanding decoder 7, one-picture data is fully reproduced and put into order. The playback data is subsequently supplied to the video expanding decoder 7. In this manner, the actual pictures are updated on the picture basis, so that a varying-speed reproduced picture which may be viewed comfortably can be reproduced. For varying-speed reproduction at the playback speed not more than (N+0.5) tuple speed, the picture updating rate may be raised by reproducing data composed only of the I-picture recorded in the first trick play area A2 and the motion vector of the P-picture recorded in the second tick play area A3.

Figure 19:
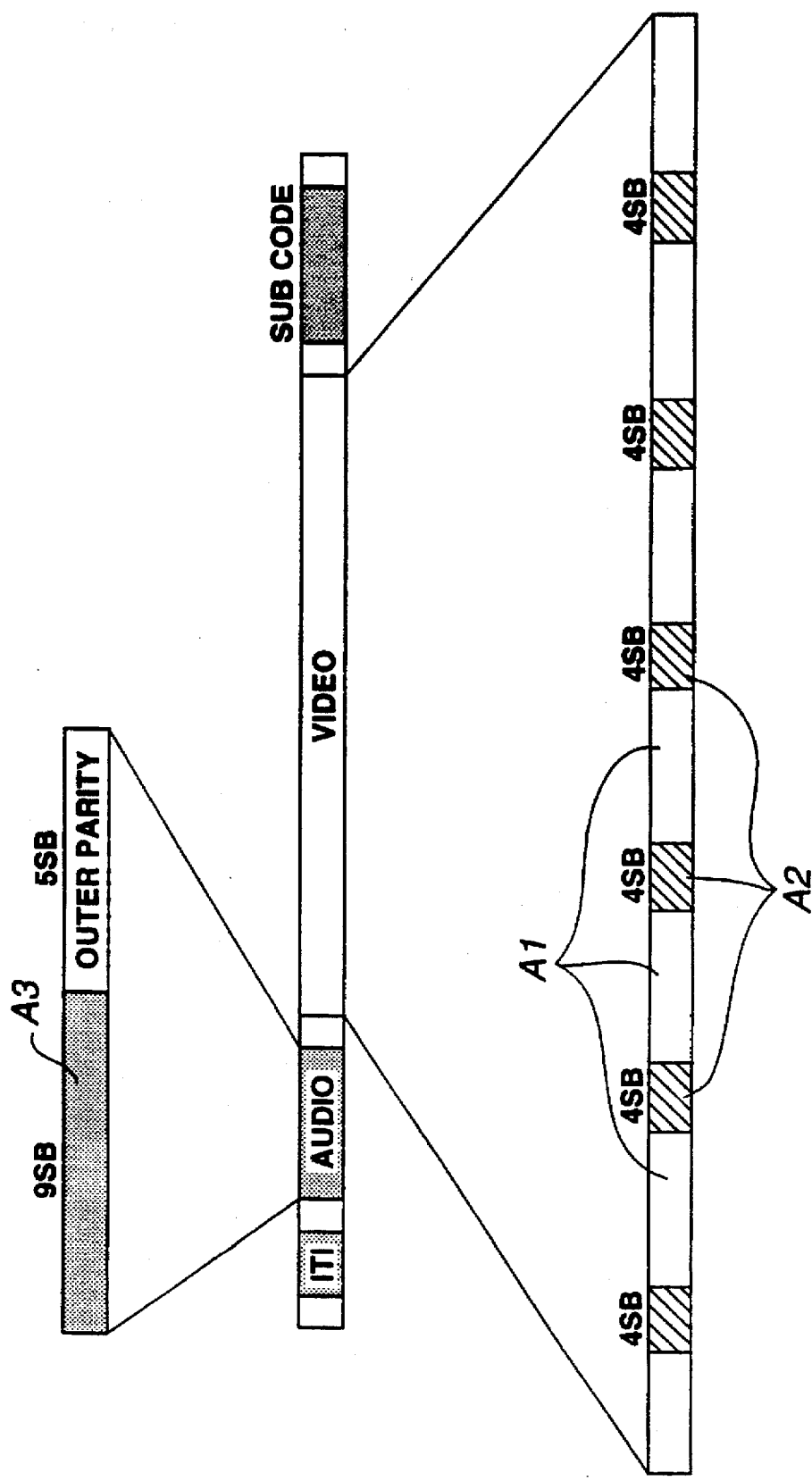
FIG. 19 shows a further illustrative example of a trick play area.

In the above-described embodiments, the second trick play area A3 is provided in the video area along with the first trick play area A2. However, if the data rate of the recording bitstream is high and there is no much allowance in the video area, the audio area may also be employed as the second trick play area A3, as shown in FIG. 19.

In addition, although the foregoing description has been made of the digital VTR recording the ATV signals, the present invention may also be applied to a digital VTR configured for recording input data produced on encoding video signals by adaptively switching between intra-picture encoding and inter-frame predictive coding.

Furthermore, the present invention may also be applied to a recording apparatus or to a reproducing apparatus, instead of to the digital VTR as in the above-described embodiments.

What is claimed is:

1. A recording apparatus for recording digital video signals in which input data is a digital video signal encoded by adaptively switching between intra-picture encoding and inter-picture predictive coding and in which the digital video signal is recorded by an inclined azimuth recording system on tracks of a magnetic tape by the inclined azimuth recording system, comprising:

extracting means for extracting the input data to be directly recorded in a first area of said tape,
   said extracting means being operable to extract data of the input data obtained on intra-picture coding as first data to be recorded in a plurality of second areas of said tape reserved for varying-speed reproduction data,
   said extracting means being operable to extract a motion vector of data of the input data obtained on inter-picture predictive coding as second data to be recorded in a plurality of third areas of said tape reserved for varying-speed reproduction data;
   multiplexing means for time-divisionally multiplexing the data extracted by said extracting means and for supplying same to said inclined azimuth recording system to cause the inclined azimuth recording system to record the input data in the first area, the first data in the second areas, and the second data in the third areas; and
   control means for causing the inclined azimuth recording system to repeatedly record the first data and the second data on a number of tracks of the same azimuth equal to the maximum number of varying playback speeds.

2. A recording/reproducing apparatus for recording and reproducing digital video signals in which input data is a digital video signal encoded by adaptively switching between intra-picture encoding and inter-picture predictive coding and in which the digital video signal is recorded by an inclined azimuth recording system on tracks of a magnetic tape by the inclined azimuth recording system, comprising:

extracting means for extracting the input data to be directly recorded in a first area of said tape,
   said extracting means being operable to extract data from the input data obtained on intra-picture coding as first data to be recorded in a plurality of second areas of said tape reserved for varying-speed reproduction data,
   said extracting means being operable to extract a motion vector of data of the input data obtained on inter-picture predictive coding as second data to be recorded in a plurality of third areas of said tape reserved for varying-speed reproduction data;
   multiplexing means for time-divisionally multiplexing data extracted by said extracting means and for supplying same to said inclined azimuth recording system to cause the inclined azimuth recording system to record the input data in the first area, the first data in the second areas, and the second data in the third areas, and for multiplexing said first data and said second data and for supplying the multiplexed first and second data repeatedly to said inclined azimuth recording system such that said first and second data are recorded on a number of tracks of the same azimuth equal to the maximum number of varying playback speeds;
   a reproducing circuit having data separating means for separating the data reproduced from said first area, the first data for varying-speed reproduction reproduced from said second areas and the second data for varying-speed reproduction reproduced from said third areas and having accumulating means for accumulating the first data for varying-speed reproduction reproduced from said second areas in first storage means and for accumulating the second data for varying-speed reproduction reproduced from said third areas in second storage means; and
   output means for selecting data reproduced from said first area and transmitted from said data separating means during normal reproduction by data switching means and outputting the selected data as playback data, and for selecting the first data for varying speed reproduction read out from said first storage means or the second data for varying speed reproduction read out from said second storage means by said data switching means during varying speed reproduction and for outputting the selected data as playback data.

3. The recording/reproducing apparatus as claimed in claim 2, wherein the output means selects only the first data for varying speed reproduction read out from said first storage means and outputting the selected data as playback data during the varying speed reproduction at the maximum varying playback speed.

4. A reproducing apparatus for reproducing digital video signals from a magnetic tape, in which the digital video signals encoded by adaptively switching between intra-picture coding and inter-picture predictive coding are recorded on plural tracks on said magnetic tape in accordance with an azimuth recording system, and in which each track includes a first area having the encoded digital video signals directly recorded thereon, a plurality of second areas on each of which data as part of the digital video signals is recorded as first data for varying speed reproduction and a plurality of third areas in each of which the motion vector of data as part of the input data obtained by inter-picture predictive coding is recorded as second data for varying speed reproduction, the first data and the second data for varying-speed reproduction being repeatedly recorded on a number of tracks of the same azimuth corresponding to the maximum number of varying playback speeds, comprising:

data separating means for separating data reproduced from said first area, separating the first data for varying-speed reproduction reproduced from said second area, and separating the second data for varying-speed reproduction reproduced from said second area;

first storage means for storing said first data for varying speed reproduction supplied via said data separating means from said second areas;

second storage means for storing said second data for varying speed reproduction supplied via said data separating means from said third areas;

data switching means for selecting data reproduced from said first area and supplied by said data separating means during normal reproduction, and for selecting the first data for varying speed reproduction read out from said first storage means and the second data for varying speed reproduction read out from said second storage means during varying speed reproduction; and output means for outputting as playback data the first data and the second data for varying speed reproduction during the varying speed reproduction.

5. The reproducing apparatus as claimed in claim 4, wherein the data switching means of the reproducing system selects only the first data for varying speed reproduction read out from said first storage means and said output means outputs the selected data as playback data during the varying speed reproduction at the maximum varying playback speed.

6. A recording method for recording digital video signals in which digital video signals, encoded by adaptively switching between intra-picture coding and inter-picture predictive coding, are recorded as input data on plural tracks of a magnetic tape in accordance with an inclined azimuth recording system, comprising the steps of:

directly recording the input data in a first area of the tape;

recording data of the input data obtained on intra-picture coding as first data for varying-speed reproduction in a plurality of second areas of the tape;

recording the motion vector of data of the input data obtained on inter-picture predictive coding as second data for varying-speed reproduction in a plurality of third areas of the tape;

extracting the data to be recorded in said first to third areas from the input data;

time-divisionally multiplexing the data extracted by said data extracting means in a sequence that causes the inclined azimuth recording system to record the input data in the first area, the first data in the second areas, and the second data in the third areas; and causing the first data and the second data for varying-speed reproduction to be repeatedly recorded on a number of tracks of the same azimuth corresponding to the maximum number of varying playback speeds.

7. A recording/reproducing method for recording/reproducing digital video signals in which digital video signals encoded by adaptively switching between intra-picture coding and inter-picture predictive coding are recorded as input data on plural tracks of a magnetic tape in accordance with an inclined azimuth recording system, comprising the steps of:

directly recording the input data in a first area of the tape;

recording data of the input data obtained on intra-picture coding as first data for varying-speed reproduction in a plurality of second areas of the tape;

recording the motion vector of data of the input data obtained on inter-picture predictive coding as second data for varying-speed reproduction in a plurality of third areas of the tape;

extracting the data to be recorded in said first to third areas from the input data;

time-divisionally multiplexing the extracted data in a sequence associated that causes the inclined azimuth recording system to record the input data in the first area, the first data in the second areas, and the second data in the third areas;

causing the first data and the second data for varying-speed reproduction to be repeatedly recorded on a number of tracks of the same azimuth corresponding to the maximum number of varying playback speeds;

separating data reproduced from said first area, separating the first data for varying-speed reproduction reproduced from said second areas, and separating the second data for varying-speed reproduction reproduced from said third areas;

accumulating the first data for varying-speed reproduction reproduced from said second areas in first storage means;

accumulating the second data for varying-speed reproduction reproduced from said third areas in second storage means;

selecting data reproduced from said first area and transmitted from said data separating means during normal reproduction and outputting the selected data as playback data;

selecting the first data for varying speed reproduction read out from said first storage means and the second data for varying speed reproduction read out from said second storage means during varying speed reproduction; and outputting the selected data as playback data.

8. The recording/reproducing method as claimed in claim 7, wherein the data switching means of the reproducing system selects only the first data for varying speed reproduction read out from said first storage means and outputting the selected data as playback data during the varying speed reproduction at the maximum varying playback speed.

9. A reproducing method for reproducing digital video signals from a magnetic tape, in which the digital video signals encoded by adaptively switching between intra-picture coding and interpicture predictive coding are recorded on plural tracks on said magnetic tape in accordance with an azimuth recording system, and in which a first area has the encoded digital video signals directly recorded thereon, a plurality of second areas in each of which data as part of the digital video signals is recorded as first data for varying speed reproduction and a plurality of third areas in each of which the motion vector of data as part of the input data obtained by inter-picture predictive coding is recorded as second data for varying speed reproduction, the first data and the second data for varying-speed reproduction being repeatedly recorded on a number of tracks of the same azimuth corresponding to the maximum number of varying playback speeds, comprising the steps of:

separating data reproduced from said first area, seperating the first data for varying-speed reproduction reproduced from said second areas, and seperating the second data for varying-speed reproduction reproduce from said third areas;

storing the first data for varying speed reproduction reproduced from said second areas;

storing the second data for varying speed reproduction reproduced from said third areas;

outputting data reproduced from said first area during normal reproduction;

outputting the stored first data for varying speed reproduction and the stored second data for varying speed reproduction during varying speed reproduction; and outputting the first data for varying speed reproduction and the second data for varying speed reproduction during the varying speed reproduction as playback data.

10. The reproducing method as claimed in claim 9, wherein the first data is selected alone for varying speed reproduction and outputting the selected data as playback data during the varying speed reproduction at the maximum varying playback speed.

* * * * *